US012765517B2

(12) United States Patent
Axelrod et al.

(10) Patent No.: US 12,765,517 B2
(45) Date of Patent: Oct. 20, 2026

(54) PET TOY HAVING STORAGE COMPARTMENT FOR ATTRACTANT AND RELEASABLY ENGAGEABLE COUPLING

(71) Applicant: T.F.H. PUBLICATIONS, INC., Neptune City, NJ (US)

(72) Inventors: Glen S. Axelrod, Colts Neck, NJ (US); Ajay Gajria, Holmdel, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 0 days.

(21) Appl. No.: 17/249,044

(22) Filed: Feb. 18, 2021

(65) Prior Publication Data

US 2022/0256808 A1 Aug. 18, 2022

(51) Int. Cl.
*A01K 15/02* (2006.01)
*A01K 5/01* (2006.01)

(52) U.S. Cl.
CPC .......... *A01K 15/026* (2013.01); *A01K 5/0114* (2013.01)

(58) Field of Classification Search
CPC .. A01K 15/026; A01K 5/0114; A01K 15/025; A01K 15/02; A01K 15/0252; A01K 15/0258; A01K 5/0287
USPC .......................................................... 119/710
See application file for complete search history.

(56) References Cited

U.S. PATENT DOCUMENTS 2,003,958 A * 6/1935 Salisbury ............. A01K 15/026 428/15
2,185,547 A * 1/1940 Fowler ................. A01K 15/026 119/709
5,553,570 A 9/1996 Van, III et al.
6,186,096 B1 * 2/2001 Miller .................. A01K 15/026 119/709

(Continued)

FOREIGN PATENT DOCUMENTS

CN 110679504 1/2020
CN 110679504 A * 1/2020

(Continued)

OTHER PUBLICATIONS

International Search Report and Written Opinion from corresponding PCT Appln. No. PCT/US22/70721, dated May 6, 2022.

(Continued)

*Primary Examiner* — Carly W. Lynch
(74) *Attorney, Agent, or Firm* — Secant IP, PLLC

(57) ABSTRACT

A pet toy comprising a first member and a second member. The first member and the second member are releasably connectable via a releasable positive mechanical engagement. The first member has a bulbous end and an elongated projection extending from the bulbous end. The second member has a bulbous end, an elongated tubular member extending from the bulbous end, and a passage, defined by a passage wall, within the elongated tubular member and the bulbous end. The elongated projection of the first member is insertable into the passage of the second member and removable from the passage of the second member. The (Continued)

elongated projection provides a first connector and the passage wall provides a second connector. The releasable positive mechanical engagement formable by the first member and the second member is formable by the first connector and the second connector.

21 Claims, 5 Drawing Sheets

(56) References Cited

U.S. PATENT DOCUMENTS

D453,242 S * 1/2002 Kaplan ................ A01K 15/026 D30/160
6,439,166 B1 * 8/2002 Markham ............ A01K 15/026 119/710
6,557,496 B2 5/2003 Herrenbruck
7,600,488 B2 10/2009 Mann
8,464,665 B1 * 6/2013 Scheffler .............. A01K 15/026 119/707
8,746,182 B2 6/2014 Anderson
9,004,012 B2 4/2015 Taylor
9,210,912 B1 * 12/2015 Conde .................. A01K 15/025
9,339,011 B1 * 5/2016 Crabtree .............. A01K 15/026
9,622,458 B2 4/2017 Williams et al.
10,149,459 B1 * 12/2018 Yuan .................... A01K 5/0114
10,212,919 B1 * 2/2019 Kovaleski ............. B29C 43/146
10,285,380 B1 * 5/2019 Mullin ................. A01K 15/026
10,448,615 B1 * 10/2019 Mullin ................. A01K 15/026
10,485,216 B2 * 11/2019 Valle .................... A01K 5/0114
10,582,696 B1 * 3/2020 Mullin ................. A01K 5/0114
10,716,290 B1 * 7/2020 Dewey ................. A01K 15/026
10,765,089 B2 9/2020 Mcilvenna
10,772,298 B1 * 9/2020 Mullin ................. A01K 5/0114
10,959,406 B2 * 3/2021 Campbell .............. A01K 15/02
2001/0029903 A1 * 10/2001 Suchowski .......... A01K 15/026 119/704
2002/0017759 A1 2/2002 McClung, III et al.
2004/0237904 A1 * 12/2004 Jia .......................... A23K 50/40 119/710
2004/0244719 A1 * 12/2004 Jager .................... A01K 15/026 119/709
2005/0045115 A1 * 3/2005 Mann ................... A01K 15/026 119/711
2006/0107905 A1 * 5/2006 Axelrod ............... A01K 15/026 119/707
2006/0134278 A1 * 6/2006 Miller .................. A01K 15/026 426/132
2006/0150919 A1 * 7/2006 Thomason ........... A01K 15/026 119/710
2008/0141948 A1 * 6/2008 Renforth .............. A01K 15/026 119/710
2008/0178813 A1 * 7/2008 Lescroart ............. A01K 5/0114 119/51.01
2009/0095231 A1 * 4/2009 Axelrod ............... A01K 15/026 119/709
2012/0145091 A1 * 6/2012 Wang ................... A01K 15/026 264/45.3
2012/0204809 A1 * 8/2012 Axelrod ............... A01K 15/026 119/709
2012/0240866 A1 * 9/2012 Taylor .................. A01K 15/026 119/710
2013/0167780 A1 * 7/2013 Axelrod ............... A01K 15/025 119/710
2014/0345532 A1 * 11/2014 Valle .................... A01K 15/026 119/51.01
2015/0296747 A1 * 10/2015 Kellogg ............... A01K 15/026 119/709
2016/0081304 A1 3/2016 Nielsen et al.
2016/0165845 A1 * 6/2016 Stone ................... A01K 5/0114 119/51.01
2016/0174527 A1 * 6/2016 Campbell ............ A01K 15/025 119/711
2016/0212975 A1 * 7/2016 Wolfe, Jr. .............. A01K 15/02
2016/0278342 A1 * 9/2016 Wolfe, Jr. ............ A01K 5/0114
2017/0223930 A1 * 8/2017 Kelsay ................. A01K 15/026
2017/0303510 A1 10/2017 Stone et al.
2019/0124888 A1 * 5/2019 Coyle .................. A61N 5/0603
2019/0133080 A1 5/2019 Wilson
2019/0261601 A1 * 8/2019 Stone ................... A01K 15/025
2020/0008398 A1 1/2020 Willinger
2021/0212290 A1 * 7/2021 Stern .................... A01K 15/026

FOREIGN PATENT DOCUMENTS

JP 2000084259 3/2000
JP 2000084259 A * 3/2000 ............... A63H 1/32
JP 2017507671 3/2017
WO WO-2007085207 A2 * 8/2007 ........... A63H 33/062

OTHER PUBLICATIONS

Extended European Search Report from related EP Appln. No. 22757176.7, dated Nov. 12, 2024.
Office Action from related Chinese Appln. No. 202280015462.3, dated Apr. 30, 2025. English translation attached.

* cited by examiner

PET TOY HAVING STORAGE COMPARTMENT FOR ATTRACTANT AND RELEASABLY ENGAGEABLE COUPLING

FIELD OF THE INVENTION

The present disclosure relates to pet toy, and more particularly to a molded pet toy having a storage compartment for an attractant composition, which is accessible via a releasably engageable coupling.

BACKGROUND

Most dogs enjoy chewing on things, although preferences vary as to the hardness of the substances favored. Some dogs like to chew on very hard materials such as cow bones, wood and nylon, while others prefer softer chews such as polyurethane or rubber. Some dogs due to their age may not be able to chew on very hard substances. Young dogs may have insufficiently developed teeth, while old dogs may have diseased gums or may have lost some of their teeth.

Furthermore, chew toys may be used as a vehicle to provide interaction between dogs and people. For example, some people like to play fetch with chew toys. The interaction between animals and their owners has reportedly been found to be not only beneficial to the animal, as it provides the animal with necessary exercise and companionship, but beneficial to their owners as well, with many reported health related benefits.

Accordingly, the prior art is replete with disclosures directed at forming a variety of chew toys. However, there is still a need to provide chew toys that fulfill other requirements. In such regards, it may be useful to provide chew toys that enhance the attraction of the chew toy to the animal. For example, by providing the chew toy with an edible and/or scented attractant composition which attract the pet to the chew toy and increases the pet's interest in playing with the pet toy.

SUMMARY

The present disclosure provides various embodiments of pet toys which may offer certain benefits as compared to pet toys known in the art.

In at least one embodiment, a pet toy is disclosed, which comprises a first member and a second member; wherein the first member and the second member are releasably connectable via a releasably engageable mechanical coupling comprising a releasable positive mechanical engagement formable by the first member and the second member; wherein the first member has a bulbous end and an elongated projection extending from the bulbous end; wherein the second member has a bulbous end, an elongated tubular member extending from the bulbous end, and a passage, defined by a passage wall, within the elongated tubular member and the bulbous end; wherein the elongated projection of the first member is insertable into the passage of the second member and removable from the passage of the second member; wherein the elongated projection provides a first connector; wherein the passage wall provides a second connector; and wherein the releasable positive mechanical engagement formable by the first member and the second member is formable by the first connector and the second connector.

In at least one embodiment of the pet toy, the first connector is a male connector and the second connector is a female connector.

In at least one embodiment of the pet toy, the male connector comprises a cylindrical male portion having a diameter; the female connector comprises a cylindrical female portion having a diameter; the diameter of the cylindrical male portion is larger than the diameter of the cylindrical female portion; and the releasable positive mechanical engagement is formed by the cylindrical male portion of the male connector passing through the cylindrical female portion of the female connector.

In at least one embodiment of the pet toy, the male connector further comprises a conical male portion; the female connector further comprises a conical female portion; and the conical male portion of the male connector and the conical female portion of the female connector act to align the male connector and the female connector on an engagement axis as the elongated projection of the first member is inserted into the passage of the second member.

In at least one embodiment of the pet toy the releasable positive mechanical engagement is formable by an annular lip the first connector and an annular shoulder of the second connector.

In at least one embodiment of the pet toy, the first connector is disposed at an end region of the elongated projection of the first member; and the second connector is disposed within the bulbous end of the second member.

In at least one embodiment of the pet toy, the bulbous end of the first member has an annular recess; and, when the releasable positive mechanical engagement is formed by the first connector and the second connector, an end of the elongated tubular member is disposed within the annular recess.

In at least one embodiment of the pet toy, the passage extends from an entrance opening at an end of the elongated tubular member to an exit opening at an end of the bulbous end; and, when the releasable positive mechanical engagement is formed by the first connector and the second connector, an end region of the elongated projection extends beyond the exit opening and/or extends beyond the bulbous end.

In at least one embodiment of the pet toy, when the releasable positive mechanical engagement is formed by the first connector and the second connector, and the end region of the elongated projection extends beyond the exit opening and/or extends beyond the bulbous end, the positive mechanical engagement is releasable by applying a force to the end region which forces at least a portion of a longitudinal length of the end region of the elongated projection which extends beyond the exit opening and/or extends beyond the bulbous end back into the passage and/or the bulbous end.

In at least one embodiment of the pet toy, the passage provides an attractant container.

In at least one embodiment of the pet toy, the bulbous end of the first member provides a closure for an end of the attractant container; and the first connector of the first member provides a closure for an opposite end of the attractant container.

In at least one embodiment of the pet toy, the elongated projection provides an attractant holder.

In at least one embodiment of the pet toy, the attractant holder has a through-hole formed in the elongated projection.

In at least one embodiment of the pet toy, the through-hole forms a rectangular slot.

In at least one embodiment of the pet toy, the through-hole is disposed between two opposing elongated retention arms of the elongated projection.

In at least one embodiment of the pet toy, the first member is formed of a polymer composition and the second member is formed of a polymer composition.

In at least one embodiment of the pet toy, the polymer composition of the first member and/or the polymer composition and the second member comprises at least one of a polyolefin polymer, a polyamide polymer, a polyurethane polymer and a polyester polymer.

In at least one embodiment of the pet toy, the first member is an injection molded first member and/or the second member is an injection molded second member.

In at least one embodiment of the pet toy, the pet toy has a longitudinal axis and the first member and the second member are rotatable about the longitudinal axis when the releasable positive mechanical engagement is formed by the first connector and the second connector.

In at least one embodiment of the pet toy, the pet toy has a shape of a bone with the bulbous end of the first member forming a first condyle of the bone and the bulbous end of the second member forming a second condyle of the bone.

In at least one embodiment of the pet toy, the pet toy further comprises at least one attractant composition which is insertable into an attractant container of the second member and/or an attractant holder of the first member,

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
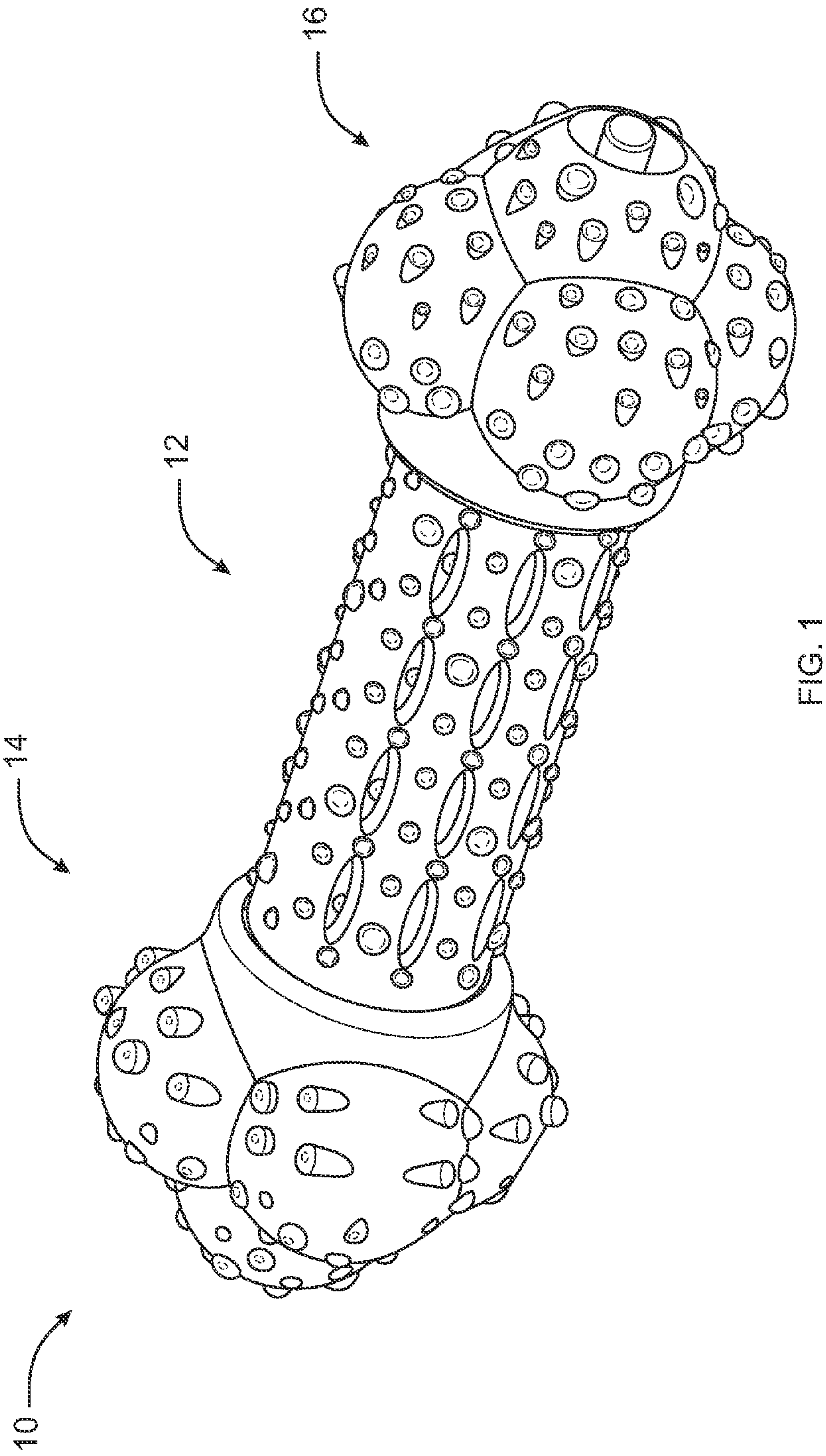
FIG. 1 is an assembled perspective view of a pet toy according to the present disclosure.
Figure 2:
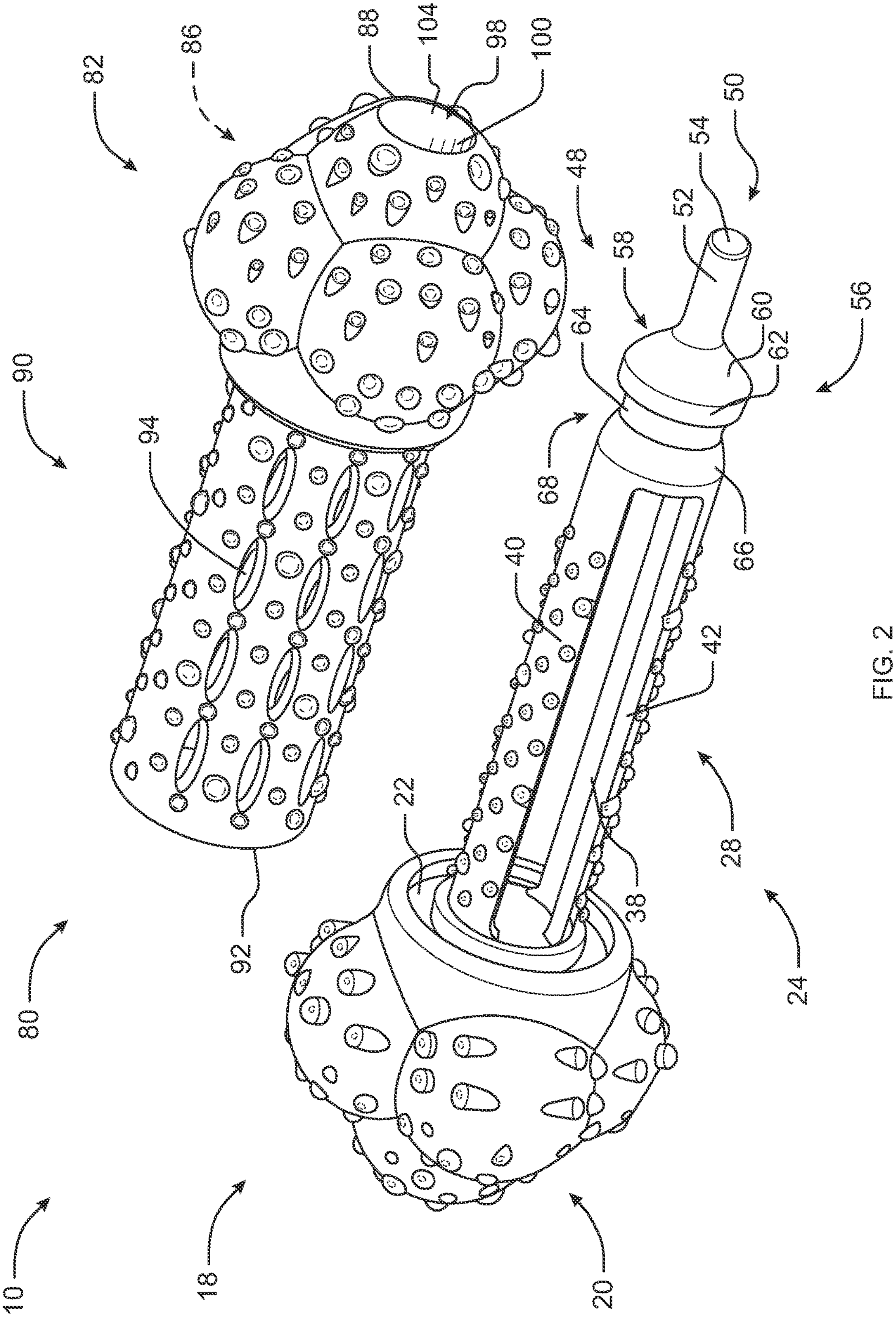
FIG. 2 is an exploded perspective view of the pet toy of FIG. 1.
Figure 3:
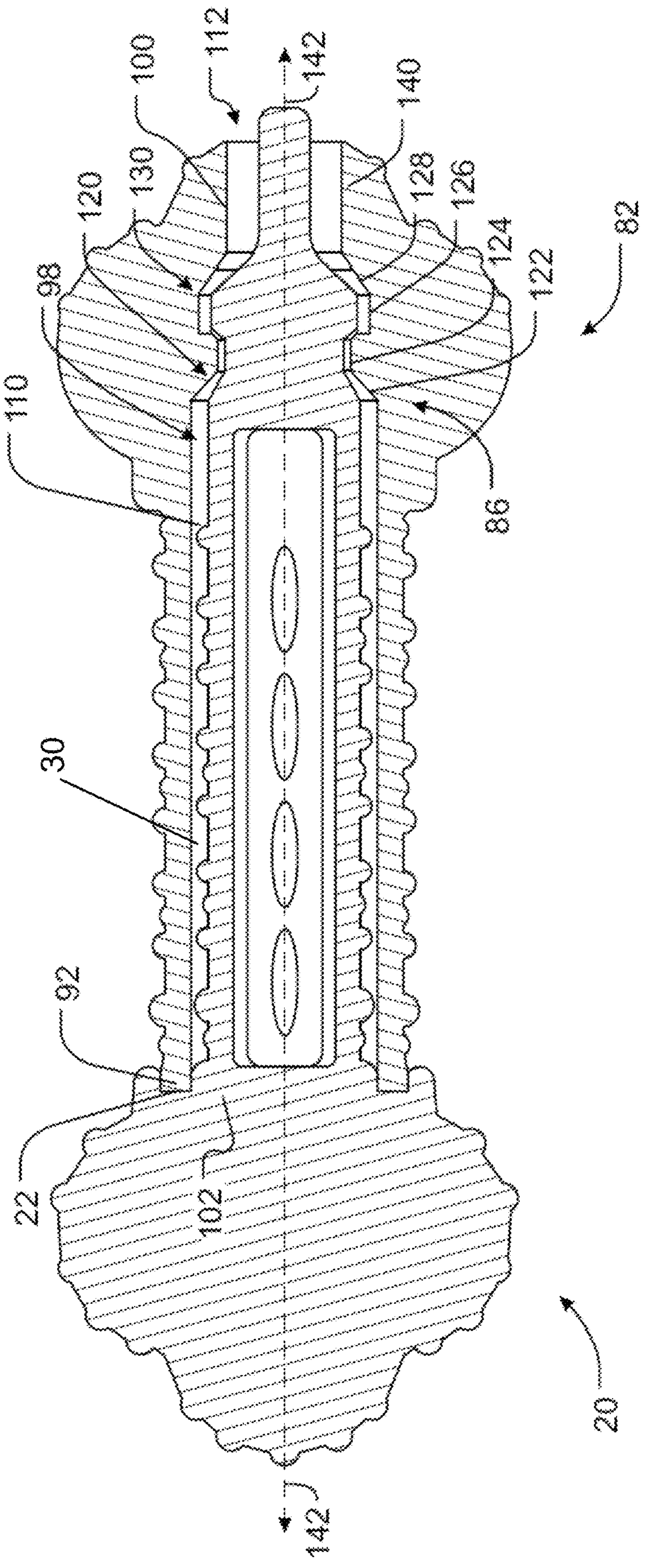
FIG. 3 is a cross-sectional view taken through the longitudinal (center) axis of the pet toy of FIG. 1.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring to FIGS. 1-7, there is shown a pet toy 10 according to the present disclosure. As shown pet toy 10 is a form of a bone, with an elongated medial shaft 12 disposed intermediate of two condyles 14, 16 disposed at the longitudinal terminal ends.

Pet toy 10 comprises two pieces, particularly a first member 18 and a second member 80, which may be more particularly molded members and even more particularly injection molded members. The first member 18 and a second member 80 may each be formed of a polymer composition, respectively. The polymer composition forming each of the first member 18 and the second member 80 may be the same polymer composition, or the polymer compositions may be different. It should be understood herein that polymer compositions are considered different if they are not exactly the same composition. For example, two polymer compositions are different herein if they have different ingredients, or different percentages of the same ingredients.

The polymer composition(s) of the first member 18 and/or the second member 80 may be rigid polymer composition(s) comprised of at least one rigid polymer, which may comprise at least one synthetic polymer and/or natural polymer and/or edible/digestible polymer. The rigid polymer composition(s) may be polymer composition(s) which have a three-point bending flexural modulus, as measured by ASTM D790-10, of greater than 150,000 psi., and more particularly greater than 200,000 psi. Additionally, or alternatively, the rigid polymer composition(s) of the first member 18 and/or the second member 80 may have a Shore D durometer hardness, as measured by ASTM D2240-05 (2010), in a range of 20-90 Shore D durometer hardness, and more particularly in a range of 40-70 Shore D durometer hardness. On the Shore A scale of durometer hardness, the first member 18 and/or the second member 80 may have a Shore A durometer hardness of 85-100 Shore A durometer hardness.

The rigid polymer(s) of the rigid polymer composition(s) may comprise, essentially consist of or consist of thermoset or thermoplastic rigid polymer(s), such as polyolefin (e.g. polypropylene, polyethylene), polyamide, polyurethane and polyester and mixtures thereof.

Alternatively, the polymer composition(s) of the first member 18 and/or the second member 80 may be elastomer polymer composition(s) comprised of at least one elastomer, which may comprise at least one synthetic polymer and/or natural polymer and/or edible/digestible polymer. The elastomer polymer composition(s) may be polymer composition(s) with a glass transition temperature (Tg) below 23° C. and which is at most, 50% crystalline (i.e., the composition contains an amorphous phase of 50% or greater, up to 100% amorphous phase). Additionally, or alternatively, the elastomer polymer composition(s) may be polymer composition(s) that has an elongation at 23° C. of at least 100%, and which, after being stretched to twice its original length and being held at such for one minute, may recover in a range of 50% to 100% within one minute after release from the stress. More particularly, the elastomer polymer composition(s) may recover in a range of 75% to 100% within one minute after release from the stress, and even more particularly recover in a range of 90% to 100% within one minute after release from the stress. Additionally, or alternatively, the elastomer polymer composition(s) of the first member 18 and/or the second member 80 may have a Shore A durometer hardness, as measured by ASTM D2240-05 (2010), in a range of 20-75 Shore A durometer hardness.

The elastomer(s) of the elastomer polymer composition(s) may comprise, essentially consist of or consist of thermoset or thermoplastic elastomer(s) such as acrylic rubber, butadiene rubber, butyl rubber, ethylene propylene rubber, ethylene propylene rubber diene monomer rubber, fluorocarbon rubber, isoprene rubber, nitrile rubber including hydrogenated nitrile rubber, polyurethane rubber, silicone rubber and styrene block copolymer (e.g. styrene butadiene rubber, styrene ethylene/butylene styrene rubber).

The polymer composition for the first member 18 and/or the second member 80 may be a thermoplastic polymer composition which may comprise, essentially consist of or consist of at least one thermoplastic polymer. The at least one thermoplastic polymer may comprise at least one a synthetic polymer and/or at least one nature polymer.

The polymer composition for the first member 18 and/or the second member 80 may comprise any edible polymer, particularly starch or other carbohydrate of natural or vegetable origin. The starch may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassaya, konjac, kudzu, oca, sago, sorghum, sweet potato, taro, yams, fava beans, lentils and peas. The starch may be present in the edible composition between 30-99% including all increments and values therebetween such as levels above 50%, 85%, etc.

The starch employed herein may be raw starch, which may be understood as starch that has not seen a prior thermal molding history, such as extrusion or other type of melt processing step where the resin is shaped in the presence of heat. The raw starch itself may also be native, which may be understood as unmodified starch recovered in the original form by extraction and not physically or chemically modified. The raw starch may also be in powder form of varying particle size, which may be in the range of 100-2000 μm including all ranges and increments therein. Raw starch may be understood as milled and/or pre-sifted starch. The raw starch may also have varying degrees of moisture present. In one embodiment moisture may be present in the raw starch between 1-60%, including all increments and values therebetween such as 40%, 20%, 10%, etc.

As shown, first member 18 comprises a bulbous end 20, which forms condyle 14, and a cantilevered elongated projection 24. Cantilevered elongated projection 24 comprises an attractant holder 28 disposed between the bulbous end 20 and a male connector 56 disposed at an end region 48 of the elongated projection 24, particularly for mechanically connecting with the second member 80.

Second member 80 comprises a bulbous end 82, which forms condyle 16 and an elongated tubular member 90. Bulbous end 82 includes an internal female connector 86 configured to mate and connect with the male connector 56 of the first member 18.

When assembled, the elongated tubular member 90 of the second member 80 forms a shaft outer member of the shaft 12, and the elongated projection 24 of the first member 18 forms a shaft inner member of the shaft 12 disposed within the elongated tubular member 90.

As shown, elongated projection 24 has an elongated enclosed through-hole 38 formed as a rectangular slot, which provides the cavity for the attractant holder 28. As shown, along its longitudinal length the through-hole 38 is defined by two opposing elongated retention arms 40, 42, the bulbous end 20 and the end region 48 of the elongated projection 24.

As shown, male connector 56 trails a locator 50 in the form of pin 52 disposed at the terminal end of end region 48. Male connector 56 comprises circular (annular) lip 58, which has a leading conical male portion 60 which is followed by an adjacent cylindrical male portion 62. Cylindrical male portion 62 is followed by another cylindrical male portion 64 of smaller diameter than cylindrical male portion 62, which is followed by another conical male portion 66, which increases the diameter back to the diameter of cylindrical male portion 62. As such, an annular (undercut) recess 68 is formed by the decrease in diameter of the cylindrical male portion 64 and conical male portion 66, which may be more particularly referred to as a groove.

For containing elongated projection 24 of first member 18, second member 80 includes a longitudinally extending passage 98 formed by a passage wall 100, which extends from an entrance opening 102 (through which the elongated projection 24 may enter) at an end 92 of the tubular member 90 to an exit opening 104 (through which the elongated projection 24 may exit) at an opposite end 88 of the bulbous end 82.

Passage 98 provides an attractant container 110 to accommodate the attractant holder 28 of the elongated projection 24 of the first member 18, and an end region 112 to accommodate locator 50 and male connector 56 of the elongated projection 24 of the first member 18.

More particularly, end region 112 includes female connector 86. As shown, female connector 86 comprises a circular (annular) shoulder 120 which has a leading conical female portion 122 which is followed by an adjacent cylindrical female portion 124. Cylindrical female portion 124 is followed by another cylindrical female portion 126 of larger diameter than cylindrical female portion 124, which is followed by another conical female portion 128, which decreases the diameter of cylindrical female portion 140 beyond that of cylindrical female portion 124. As such, an annular (undercut) recess 130 is formed by the increase in diameter of the cylindrical female portion 126 and conical female portion 128, which may be more particularly referred to as a groove.

During assembly, elongated projection 24 of the first member 18 is inserted into passage 98 of second member 80. As the elongated projection 24 extends within passage 98, the locator 50 may contact conical female portion 122 of second member 80, which may occur particularly if the elongated projection 24 is inserted into the passage 98 at an angle relative to the longitudinal axis 142. However, due to the slope of conical female portion 122 narrowing the passage 98 as the passage 98 extends toward exit opening 104, the locator 50, and hence the elongated projection 24, is guided back towards the longitudinal axis 142. Thereafter, the locator 50 may similarly contact conical female portion 128 of second member 80, and similarly guided back towards the longitudinal axis 142 due to the slope of conical female portion 128 narrowing the passage 98 as the passage 98 extends toward exit opening 104.

As elongated projection 24 of the first member 18 is further inserted into passage 98 of the second member 80, the slope of conical male portion 60 of the first member 18 makes contact with the slope of conical female portion 122 of the second member 80 and, due to their relative angles of inclination, further act to align the elongated projection 24 of first member 18 and the passage 98 of the second member 80 to assist and guide alignment for assembly/engagement on the longitudinal axis 142. In such regards, the longitudinal axis 142 may also be referred to as an engagement axis and/or a disengagement axis.

Thereafter, due to cylindrical male portion 62 of the first member 18 having a diameter slightly larger than a smaller diameter of the cylindrical female portion 124 of the second member 80 (e.g. 0.1 mm-0.5 mm), further insertion of elongated projection 24 of the first member 18 into passage 98 of second member 80 results in elastic deformation of at least one of the first member 18 and the second member 80 as the cylindrical male portion 62 of the first member 18 extends through the cylindrical female portion 124 of the second member 80.

Once the cylindrical male portion 62 of the first member 18 passes through the cylindrical female portion 124 of the second member 80, the first member 18 and/or the second member 80 then returns to its pre-deformation state, in which case the a positive mechanical engagement connection is formed between the first member 18 and the second member 80 which inhibits separation of the first member 18 and the second member 80 from one another. A positive mechanical engagement connection may be understood herein as a connection formed between the components which does not rely solely on friction to inhibit separation of the components and which includes a mechanical interlock to inhibit separation of the components (e.g. overlapping surfaces).

Simultaneously, as the cylindrical male portion 62 of the first member 18 extends and passes through the cylindrical female portion 124 of the second member 80, the end 92 of the tubular member 90 enters an annular recess 22 in the bulbous end 20, which holds the first member 18 and the second member 80 in proper orientation with respect to one another relative to the longitudinal axis 142.

With the foregoing arrangement, a releasably engageable coupling is formed and, once the first member 18 and the second member 80 are engaged, the first member 18 and the second member 80 are rotatable relative to one another about the longitudinal axis 142.

As shown, the tubular member 90 of the second member 80 includes a plurality of window apertures 94. As such, when the pet toy 10 is loaded with an attractant composition which are held by attractant container 110 and/or the attractant holder 28, particularly between retention arms 40, 42 of the elongated projection 24, a scent (e.g. aroma, odor) of the attractant composition may pass through the window apertures 94 which may be detected by an animal (dog) and attract the animal to play with the pet toy 10. It should be understood that the one end of the attractant container 110 provided by passage 98 is closed by the bulbous end 20 of the first member 18 and the opposing end of the attractant container 110 is closed by the first connector 56 of the first member 18. The attractant composition may be edible treats which are consumable by the pet.

Figure 4:
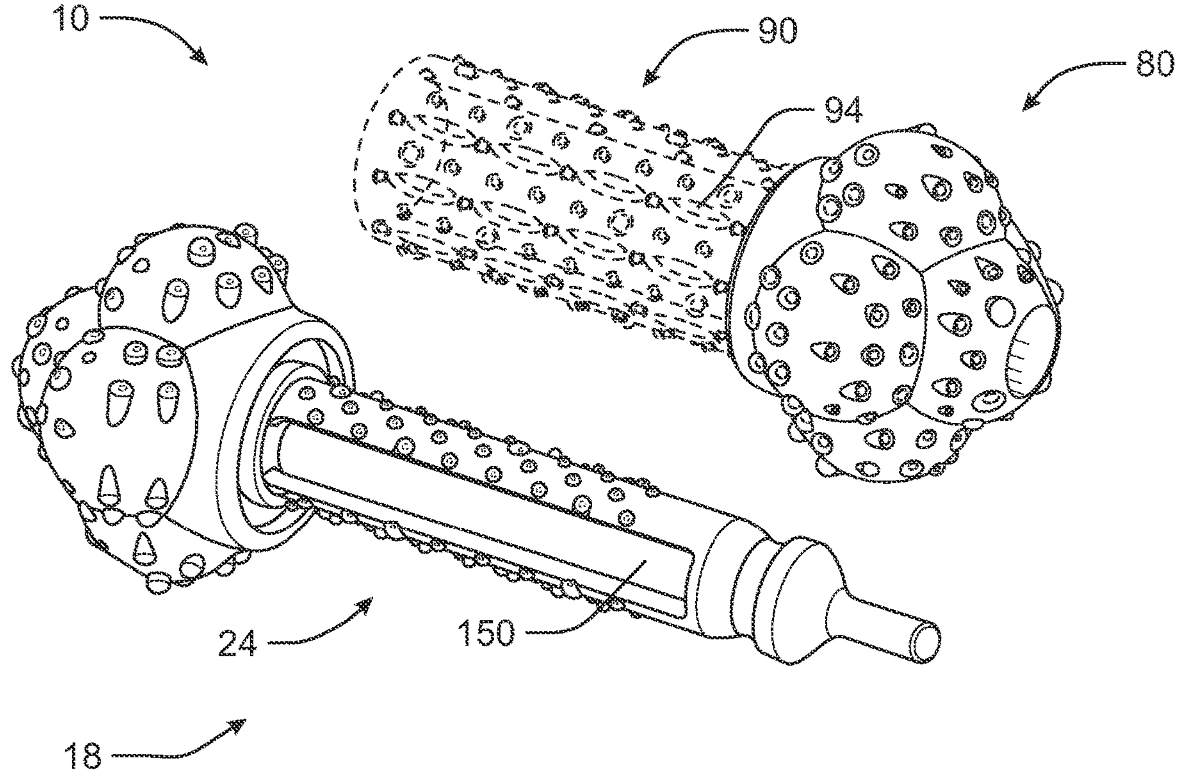
FIG. 4 is an exploded perspective view of the pet toy of FIG. 1, with an attractant composition provided therewith.
Figure 5:
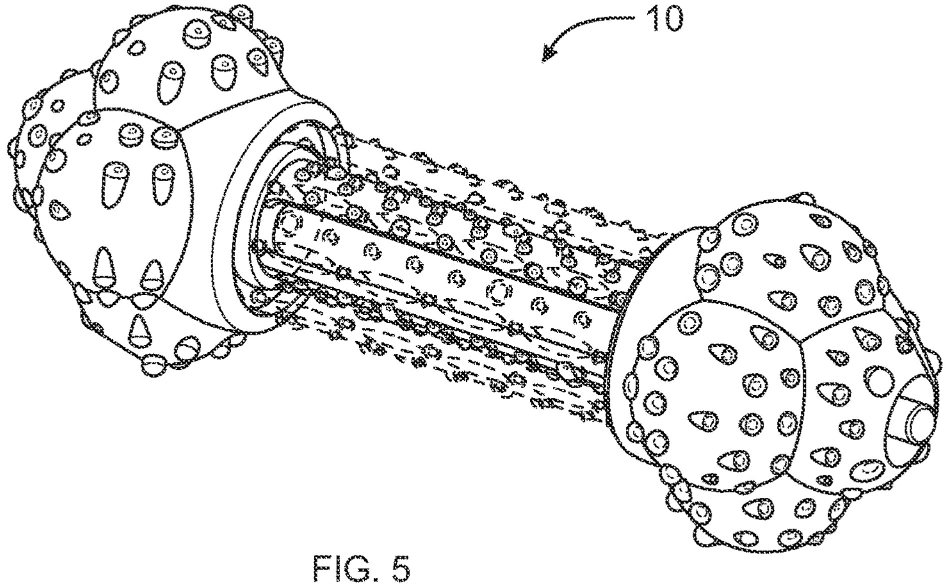
FIG. 5 is an assembled perspective view of a pet toy of FIG. 4.

Referring to FIG. 4, an attractant composition 150 is shown disposed between retention arms 40, 42 of the elongated projection 24. The attractant composition 150 may be a scented composition, which may have a scent of a foodstuff (e.g. bacon), or simply of a scent of an animal (e.g. pig, chicken, bison, horse). The attractant composition 150 and the scent may be provided by a portion of an animal anatomy, which may include ears (e.g. pig), feet (clawed feet (e.g. chicken), hooved feet (e.g. pig), webbed feet (e.g. duck)), penis/pizzle (e.g. bull), antler (e.g. deer, elk), rib, femur, knee, elbow or other bone (e.g. cow), and skin/hide (e.g. pig). In this embodiment, the attractant composition 150 may be a malleable foodstuff composition (e.g. flour containing dough, paste), which adheres to the retention arms 40, 42 of the elongated projection 24. FIG. 5 shows the pet toy 10 assembled, containing the attractant composition 150, with the tubular member 90 shown to be transparent as to see the attractant composition 150 therein. The scent of the composition 150 may pass through apertures 94 in the tubular member 90 to be detected by a pet, while the composition 150 itself may remain retained within tubular member 90.

Figure 6:
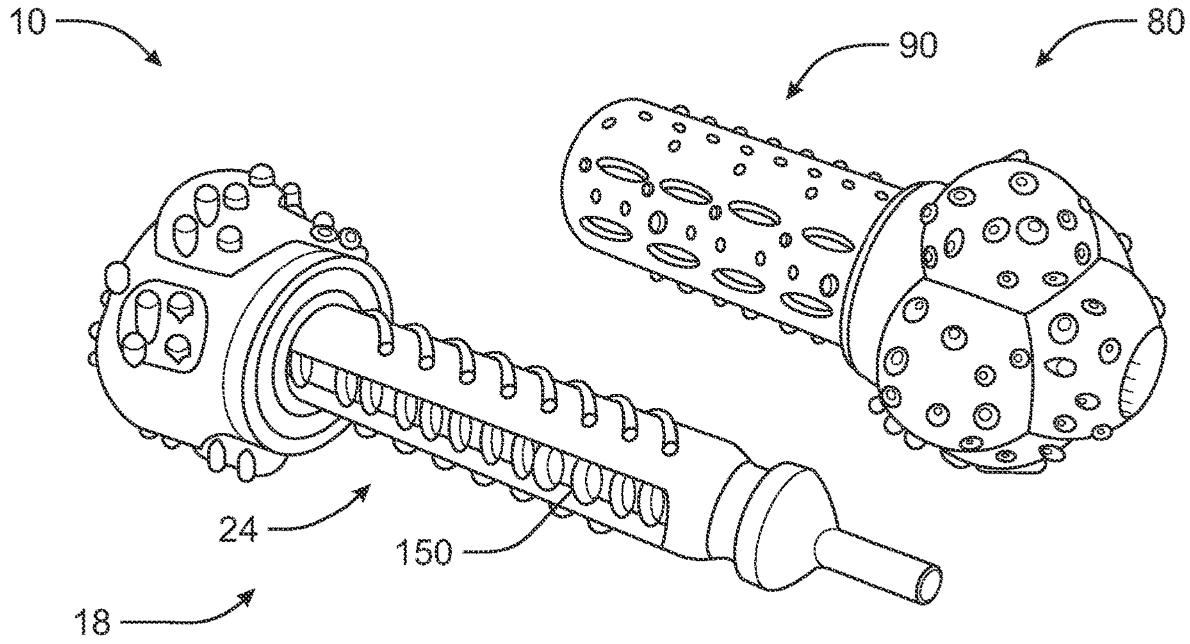
FIG. 6 an exploded perspective view of the pet toy of FIG. 1, with another attractant composition provided therewith.
Figure 7:
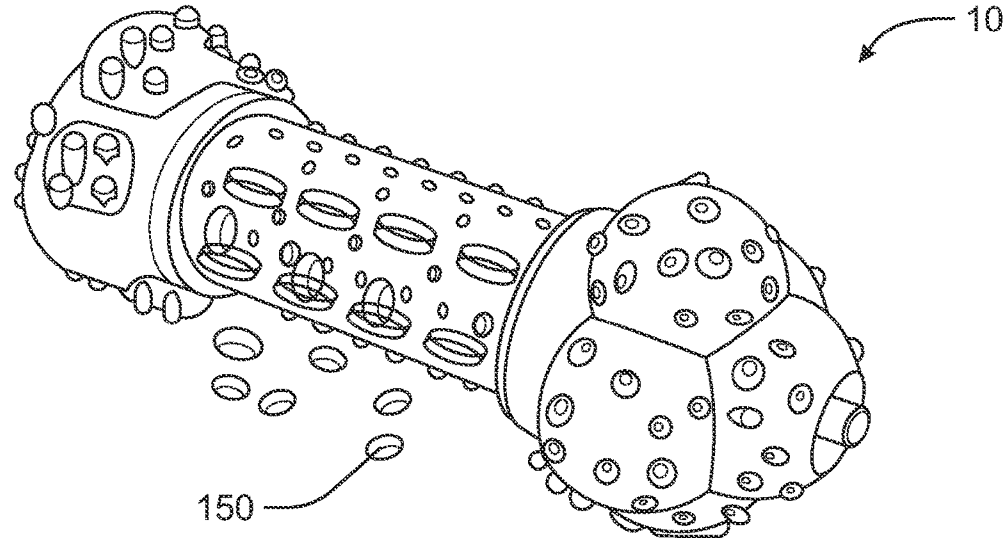
FIG. 7 is an assembled perspective view of a pet toy of FIG. 6.

Referring to FIG. 6, an attractant composition 150 is again shown disposed between retention arms 40, 42 of the elongated projection 24. The attractant composition 150 may be a scented composition, which may have a scent of a foodstuff (e.g. bacon), or simply a scent of an animal (e.g. pig, chicken, bison, horse). The attractant composition 150 and the scent may be provided by a portion of an animal anatomy, which may include ears (e.g. pig), feet (clawed feet (e.g. chicken), hooved feet (e.g. pig), webbed feet (e.g. duck)), penis/pizzle (e.g. bull), antler (e.g. deer, elk), rib, femur, knee, elbow or other bone (e.g. cow), and skin/hide (e.g. pig). In this embodiment the attractant composition 150 may be a rigid, breakable foodstuff composition (e.g. kibble or other hard (dry) food), which is mechanically engaged between the retention arms 40, 42 with an interference fit. FIG. 7 shows the pet toy 10 assembled, containing the attractant composition 150, with the tubular member 90 shown to be transparent as to see the attractant composition 150 therein. The scent of the composition 150 may pass through apertures 94 in the tubular member 90 to be detected by a pet. In this embodiment, the first member 18 and the second member 80 may each be formed of an elastomer polymer composition such that the pet toy 10 is flexible and flexes (deforms and collapses), particularly tubular member 90, in response to being bitten by the pet (dog). In such manner, when the tubular member 90 collapses under the biting, the rigid, breakable foodstuff composition 150 may break into numerous pieces and thereafter exit the pet toy 10 through apertures 94 to be consumed by the pet.

As shown, the distal end 54 of the locator 50/pin 52 of the elongated projection 24 extends through (beyond) the exit opening 104 of the passage 98 (formed by the bulbous end 82) and extends/projects beyond the bulbous end 82 of the second member 80. To separate or otherwise disengage the first member 18 and the second member 80 when engaged, at least a portion of a longitudinal length of the end region 48 of the elongated projection 24 of the first member 18, which may include the distal end 54, may be forced (pushed) back into the passage 98 along the longitudinal axis 142 while a relative axial position of the second member 80 is held constant. In such manner, the cylindrical male portion 62 of the first member 18 extends through the cylindrical female portion 124 of the second member 80 in a disassembly/disengagement direction, which is opposite the assembly/engagement direction above, at which time the at least one of the first member 18 and the second member 80 elastically deforms to permit travel though the passage 100. Once the cylindrical male portion 62 of the first member 18 passes through the cylindrical female portion 124 of the second member 80, the first member 18 and/or the second member 80 again returns to its pre-deformation state. The elongated projection 24 may now be completely removed from passage 98. At this time, the attractant composition may lose its scent, or otherwise no longer attract interest of the pet, may be removed from the attractant container 110 and/or attractant holder 28 and replaced with a new attractant composition. Additionally, or alternatively, if the attractant composition comprises consumable articles (e.g. treats, kibble, hard food) which have been removed from the pet toy 10 by the pet, the pet toy may now be reloaded with a new batch of consumable articles. Thereafter, the first member 18 and the second member 80 may be reengaged as explained above.

LISTING OF REFERENCE CHARACTERS

10 pet toy
12 shaft

14 condyle
16 condyle
18 first member
20 bulbous end
22 recess
24 projection
28 attractant holder
30 continuous loop
38 through hole
40 retention arm
42 retention arm
48 end region
50 locator
52 pin
54 end
56 first (male) connector
58 lip
60 conical male portion
62 cylindrical male portion
64 cylindrical male portion
66 conical male portion
68 annular recess
80 second member
82 bulbous end
86 second (female) connector
88 end
90 tubular member
92 end
94 windows/apertures
98 passage
100 passage wall
102 entrance opening
104 exit opening
110 attractant container
112 end region
120 shoulder
122 conical female portion
124 cylindrical female portion
126 cylindrical female portion
128 conical female portion
130 annular recess
140 cylindrical female portion
142 longitudinal axis
150 attractant composition

What is claimed is:

1. A pet toy having a longitudinal axis, comprising:

a first member and a second member;

wherein the first member and the second member are releasably connectable via a releasable positive mechanical engagement formable by the first member and the second member;

wherein the first member is a single piece member having a first member bulbous end and an elongated projection extending from the first member bulbous end;

wherein the second member is a single piece member having a second member bulbous end, an elongated tubular member extending from the second member bulbous end, and a passage, defined by a passage wall, within the elongated tubular member and the second member bulbous end;

wherein the elongated projection of the first member is insertable into the passage of the second member and removable from the passage of the second member;

wherein the elongated projection provides a first connector;

wherein the passage wall provides a second connector;

wherein the releasable positive mechanical engagement formable by the first member and the second member is formable by the first connector and the second connector;

wherein, when the first member and the second member are releasably connected via the releasable positive mechanical engagement, the passage comprises an attractant container disposed along the longitudinal axis between the releasable positive mechanical engagement and the first member bulbous end;

wherein, when the first member and the second member are releasably connected via the releasable positive mechanical engagement, the elongated projection extends through the attractant container along the longitudinal axis such that the attractant container has a continuous loop around at least a portion of a longitudinal length of the elongated projection configured to contain an attractant composition;

wherein the elongated tubular member comprises a plurality of window apertures, which are open to the continuous loop of the attractant container and are disposed along the longitudinal axis, through which the attractant composition is removable along the longitudinal axis from the pet toy;

wherein the releasable positive mechanical engagement is engageable by elastic deformation of at least one of the first connector and the second connector as the first connector extends through the second connector along the longitudinal axis, and return of at least one of the first connector and the second connector to a pre-deformation state after the first connector extends through the second connector along the longitudinal axis to form the releasable positive mechanical engagement;

wherein the releasable positive mechanical engagement is a mechanical interlock;

wherein the passage extends from an entrance opening at an end of the elongated tubular member to an exit opening at an end of the second member bulbous end; and wherein, when the releasable positive mechanical engagement is formed by the first connector and the second connector, an end region of the elongated projection extends beyond the second member bulbous end.

2. The pet toy of claim 1, wherein the first connector is a male connector and the second connector is a female connector.

3. The pet toy of claim 2, wherein the male connector comprises a cylindrical male portion having a diameter;

wherein the female connector comprises a cylindrical female portion having a diameter;

wherein the diameter of the cylindrical male portion is larger than the diameter of the cylindrical female portion; and wherein the releasable positive mechanical engagement is formed by the cylindrical male portion of the male connector passing through the cylindrical female portion of the female connector.

4. The pet toy of claim 3, wherein the male connector further comprises a conical male portion;

wherein the female connector further comprises a conical female portion; and wherein the conical male portion of the male connector and the conical female portion of the female connector act to align the male connector and the female connector on an engagement axis as the elongated projection of the first member is inserted into the passage of the second member.

5. The pet toy of claim 1, wherein the releasable positive mechanical engagement is formable by an annular lip of the first connector, and an annular shoulder of the second connector.

6. The pet toy of claim 1, wherein the first connector is disposed at an end region of the elongated projection of the first member; and wherein the second connector is disposed within the second member bulbous end.

7. The pet toy of claim 1, wherein the first member bulbous end has an annular recess; and wherein, when the releasable positive mechanical engagement is formed by the first connector and the second connector, an end of the elongated tubular member is disposed within the annular recess.

8. The pet toy of claim 1, wherein, when the releasable positive mechanical engagement is formed by the first connector and the second connector, the end region of the elongated projection extends beyond the exit opening.

9. The pet toy of claim 1, wherein, when the releasable positive mechanical engagement is formed by the first connector and the second connector and the end region of the elongated projection extends beyond the second member bulbous end, the positive mechanical engagement is releasable by applying a force along the longitudinal axis to the end region which forces at least a portion of a longitudinal length of the end region of the elongated projection which extends beyond the second member bulbous end back into the passage and/or the second member bulbous end.

10. The pet toy of claim 1, wherein the first member bulbous end provides a closure for an end of the attractant container and wherein the first connector of the first member provides a closure for an opposite end of the attractant container.

11. The pet toy of claim 1, wherein the elongated projection provides an attractant holder within an attractant container to hold at least one attractant in the passage separated from the passage wall.

12. The pet toy of claim 11, wherein the attractant holder has a through-hole formed in the elongated projection.

13. The pet toy of claim 12, wherein the through-hole forms a rectangular slot.

14. The pet toy of claim 12 wherein the through-hole is disposed between two opposing elongated retention arms of the elongated projection.

15. The pet toy of claim 1, wherein the first member is formed of a polymer composition and the second member is formed of a polymer composition.

16. The pet toy of claim 15, wherein the polymer composition of the first member and/or the polymer composition of the second member comprises at least one of a polyolefin polymer, a polyamide polymer, a polyurethane polymer and a polyester polymer.

17. The pet toy of claim 1, wherein the first member is an injection molded first member and/or the second member is an injection molded second member.

18. The pet toy of claim 1, wherein the pet toy has a longitudinal axis and the first member and the second member are rotatable about the longitudinal axis when the releasable positive mechanical engagement is formed by the first connector and the second connector.

19. The pet toy of claim 1 wherein the pet toy has a shape of a bone with the first member bulbous end forming a first condyle of the bone and the second member bulbous end forming a second condyle of the bone.

20. The pet toy of claim 1, further comprising at least one attractant which is insertable into an attractant container of the second member and/or an attractant holder of the first member.

21. The pet toy of claim 1, wherein the end region of the elongated projection which extends beyond the second member bulbous end comprises a locator which guides the first connector of the elongated projection towards the longitudinal axis in response to the end region of the elongated projection contacting the second connector as the first connector extends through the second connector along the longitudinal axis.

* * * * *